United States Patent [19]

Kühnke et al.

[11] 4,400,822

[45] Aug. 23, 1983

[54] X-RAY DIAGNOSTIC GENERATOR COMPRISING TWO HIGH VOLTAGE TRANSFORMERS FEEDING THE X-RAY TUBE

[75] Inventors: Hermann Kühnke, Aurachtal; Manfred Rattner, Buckenhof, both of Fed. Rep. of Germany

[73] Assignee: Siemens Aktiengesellschaft, Berlin & Munich, Fed. Rep. of Germany

[21] Appl. No.: 206,135

[22] Filed: Nov. 12, 1980

[30] Foreign Application Priority Data

Dec. 20, 1979 [DE] Fed. Rep. of Germany ... 7935945[U]

[51] Int. Cl.[3] ............ G03B 41/16

[52] U.S. Cl. ............ 378/103; 378/101; 378/202

[58] Field of Search ............ 250/421, 402, 419, 420

[56] References Cited

U.S. PATENT DOCUMENTS

| | | | |
|---|---|---|---|
| 2,025,139 | 12/1935 | Waite | 250/419 |
| 2,168,801 | 8/1939 | Lee | 250/419 |
| 2,786,948 | 3/1957 | Boucher | 250/421 |
| 4,216,382 | 8/1980 | Franke | 250/421 |

OTHER PUBLICATIONS

"Electronics for Scientists and Engineers", Benedict Prentice-Hall 1967, p. 273.

*Primary Examiner*—Craig E. Church
*Attorney, Agent, or Firm*—Hill, Van Santen, Steadman & Simpson

[57] ABSTRACT

In an exemplary embodiment, the secondary parts of the high voltage transformers each are connected with a respective doubler circuit formed of rectifiers and capacitors. All components are arranged in a single oil-filled receptacle which has a radiation exit window for transmitting the x-radiation. The two high voltage transformers are disposed symmetrically relative to the radiation exit window in proximity to respective receptacle sidewalls and adjacent the x-ray tube. The rectifiers and capacitors are disposed above the x-ray tube and symmetrically relative to the radiation exit window.

2 Claims, 3 Drawing Figures

X-RAY DIAGNOSTIC GENERATOR COMPRISING TWO HIGH VOLTAGE TRANSFORMERS FEEDING THE X-RAY TUBE

BACKGROUND OF THE INVENTION

The invention relates to an x-ray diagnostic generator comprising an x-ray tube and two high voltage transformers feeding the x-ray tube, the secondary parts of said high voltage transformers being each connected with a doubler circiut for the output voltage of the corresponding high voltage secondary part which doubler circuit is comprised of rectifiers and capacitors.

In the case of an x-ray diagnostic generator of this type the voltage on the x-ray tube is four times as great as the secondary voltage of a high voltage transformer, since each secondary voltage is doubled in the associated doubler circuit, and the two doubler circuits are connected in series with one another.

SUMMARY OF THE INVENTION

The object underlying the invention, in the case of an x-ray diagnostic generator of the type initially cited, resides in housing all components in a space-saving manner.

In accordance with the invention, this object is achieved in that all components are arranged in an oil-filled receptacle which exhibits a radiation exit window for the x-radiation, whereby the two high voltage transformers adjacent the x-ray tube are disposed symmetrically relative to the radiation exit window of the receptacle walls and the rectifiers and capacitors above the x-ray tube are likewise disposed symmetrically relative to the radiation exit window. In the case of the inventive x-ray diagnostic generator, all components are arranged in a single receptacle such that the space requirement for the entire generator is very small.

The invention shall be explained in greater detail in the following on the basis of an exemplary embodiment illustrated on the accompanying drawing sheets; and other objects, features and advantages will be apparent from this detailed disclosure and from the appended claims.

DETAILED DESCRIPTION

Figure 1:
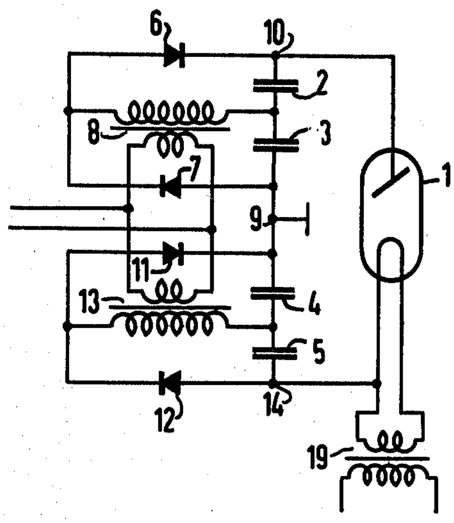
FIG. 1 illustrates the circuit diagram of an x-ray diagnostic generator in order to explain the invention.

In FIG. 1 an x-ray tube 1 is illustrated which has a series connection of four high voltage capacitors 2 through 5 connected between its anode and cathode. The circuit point 9 between the capacitors 3 and 4 is connected to ground. The capacitors 2 and 3, together with two high voltage rectifiers 6 and 7, form a voltage double circuit for the output voltage of a high voltage transformer 8; i.e., the voltage between the points 9 and 10 is twice as great as the secondary voltage of the high voltage transformer 8. In the same fashion, the capacitors 4 and 5, together with two high voltage rectifiers 11 and 12, form a doubler circuit for the output voltage of a high voltage transformer 13; i.e., the voltage between the points 9 and 14 is twice as great as the secondary voltage of the high voltage transformer 13. Thus, quadruple the value of the secondary voltage of a high voltage transformer 8, 13 is connected to the x-ray tube 1.

Figure 2:
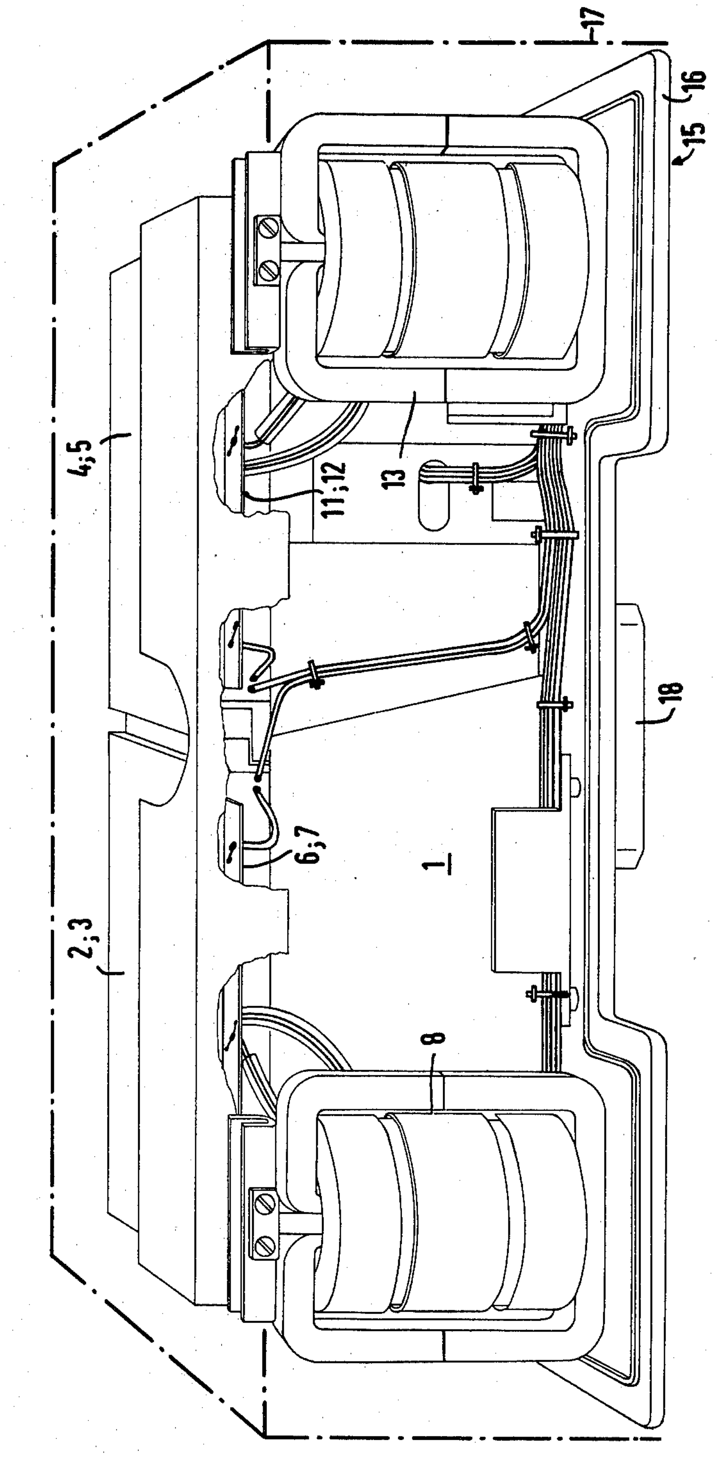

From FIG. 2 it is apparent that all components are arranged in a single oil-filled receptacle 15 of which, in FIG. 2, the base plate 16 is shown removed from its associated housing 17 (which is indicated only by dash-dot lines). The x-ray tube 1 radiates through a radiation exit window 18 relative to which the two high voltage transformers 8, 13 are arranged adjacent the x-ray tube 1 symmetrically in proximity to the housing 17 which forms the receptacle walls. The rectifiers 6, 7, and the capacitors 2, 3, for the high voltage transformer 8 are disposed above the x-ray tube 1 on the one side of the symmetry plane of the x-ray diagnostic generator (which side is nearer to transformer 8) and the rectifiers 11, 12, and the high voltage capacitors 4, 5, for the high voltage transformer 13 are disposed above the x-ray tube location, and on the other side of the symmetry plane of the x-ray diagnostic generator (which side is nearer to transformer 13). The rectifiers 6, 7, 11, 12, which are arranged on insulating material plates, are here disposed, like the capacitors 2, 3 and 4, 5, symmetrically relative to the radiation exit window 18.

Figure 3:
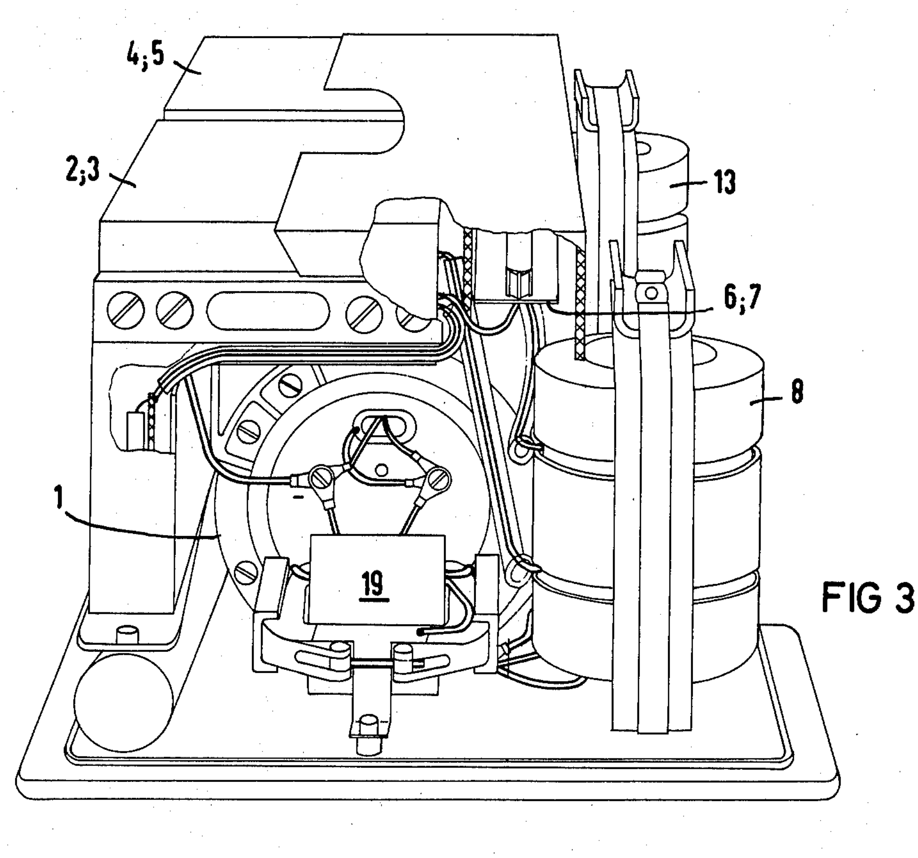
FIGS. 2 and 3 illustrate two different views showing the spatial construction of the x-ray diagnostic generator according to FIG. 1.

From FIG. 3, in which the housing 17 is not illustrated, it is additionally apparent that the filament transformer 19 for the x-ray tube 1 is arranged in the receptacle in proximity of the left end of the x-ray tube 1 in FIG. 2.

The supply of the primary windings of the high voltage transformers 8, 13 can proceed from an inverter with a frequency in the kHz-range of between one and five kilohertz (1 and 5 kHz). It is thereby possible to design the high voltage transformers 8, 13 to be small and lightweight.

It will be apparent that many modifications and variations may be effected without departing from the scope of the novel concepts and teachings of the present invention.

We claim as our invention:

1. An x-ray diagnostic generator comprising: an x-ray tube, two high voltage transformers disposed in a common plane feeding the x-ray tube having respective secondary parts, two doubler circuits for the output voltage, one connected with each of said high voltage secondary parts, the doubler circuits comprising rectifiers and capacitors, a single oil-filled receptacle, and a flat base plate having a radiation exit window centrally disposed therein; said x-ray tube, said two high voltage transformers and said doubler circuits being disposed in said single oil-filled receptacle, said radiation exit window being aligned with said x-ray tube and disposed at one side of said x-ray tube for transmitting x-radiation therefrom, said two high voltage transformers being disposed adjacent respective opposite ends of the x-ray tube and symmetrically relative to the radiation exit window, the rectifiers and capacitors being disposed on an opposite side of the x-ray tube and being remote from and symmetrically disposed relative to the radiation exit window, the two high voltage transformers being mounted on said base plate adjacent respective opposite ends thereof, the x-ray tube being mounted on said base plate and offset in a direction parallel to said common plane from the two high voltage transformers, the rectifiers and capacitors being disposed on the side of the x-ray tube remote from said base plate and being supported in conjunction with the opposite ends of said high voltage transformers at a distance from said base plate, and a removable housing mating with said base plate for enclosing and defining said oil-filled receptacle.

2. An x-ray diagnostic generator according to claim 1, with a filament transformer arranged in the receptacle in proximity to one end of the x-ray tube.

* * * * *